Figure 1:
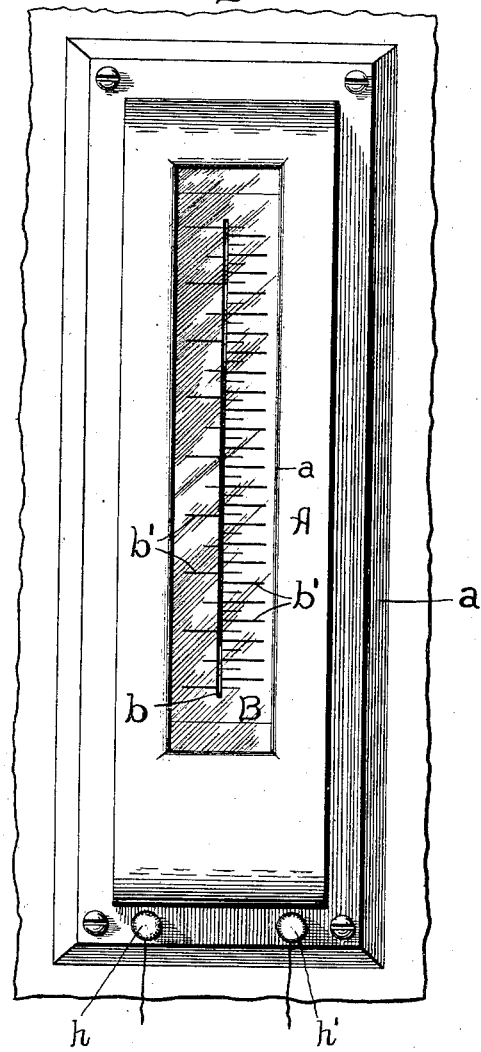

No. 729,164. PATENTED MAY 26, 1903.
C. D. HASKINS.
INDICATING INSTRUMENT.
APPLICATION FILED FEB. 28, 1901.
NO MODEL. 2 SHEETS—SHEET 1.

Witnesses.
Marcus L. Byng
Benjamin W. Hull

Inventor.
Caryl D. Haskins,
by Albert G. Davis
Atty.

No. 729,164. PATENTED MAY 26, 1903.
C. D. HASKINS.
INDICATING INSTRUMENT.
APPLICATION FILED FEB. 28, 1901.
NO MODEL. 2 SHEETS—SHEET 2.

Witnesses.
Marcus L. Byng.
Benjamin B. Hull.

Inventor:
Caryl D. Haskins,
by Albert G. Davis
Att'y.

No. 729,164. Patented May 26, 1903.

UNITED STATES PATENT OFFICE.

CARYL D. HASKINS, OF SCHENECTADY, NEW YORK, ASSIGNOR TO GENERAL ELECTRIC COMPANY, A CORPORATION OF NEW YORK.

INDICATING INSTRUMENT.

SPECIFICATION forming part of Letters Patent No. 729,164, dated May 26, 1903.

Application filed February 28, 1901. Serial No. 49,365. (No model.)

*To all whom it may concern:*

Be it known that I, CARYL D. HASKINS, a citizen of the United States, residing at Schenectady, county of Schenectady, State of New York, have invented certain new and useful Improvements in Indicating Instruments, of which the following is a specification.

This invention relates to indicating instruments, and is of special advantage in applications where the angular range of deflection is limited, serving in such cases to permit an open scale with a liberal distance between the calibrating-marks. In electric measuring instruments—for example, voltmeters, ammeters, wattmeters, &c.—the range of deflection is commonly ninety degrees or less, requiring for an open scale a long pointer, the inertia of which requires considerable damping force to render the instrument dead-beat, and the lateral spread of scale necessitates a casing which occupies more horizontal space than is desirable. In switchboard instruments, for example, the conditions of central-station construction trend more and more toward a crowding of apparatus, which necessitates narrowing and restricting the space available for switchboards. This restriction, however, is greater with respect to width and floor-space than it is with respect to height, so that it becomes highly desirable to design the instruments with vertical scales in order to get as many as possible side by side on a single switchboard. This has led to a so-called "edgewise" arrangement of parts and the placing of a bent scale facing in the same direction as the switchboard; but these instruments are undesirable for several reasons. The reflection from the bent glass or other material covering the scale frequently prevents accurate reading, and the bent scale itself, together with the limited angle of vision, makes the reading difficult except over a small area of the scale. Furthermore, vertical-scale instruments for alternating current especially have been more or less unreliable when it has been attempted to make them dead-beat, because the elements which make it possible to construct a dead-beat instrument require the moving parts to be comparatively heavy, and inasmuch as the vertical-scale instruments heretofore in use have had their moving parts mounted on horizontal pivots the friction resulting from this increase in weight has been prohibitively high. My invention lends itself with special advantage to instruments for such employment, since it admits of a great spread of scale relatively to the angular movements of the movable element. It is, however, of wider application and may be employed with great advantage wherever a long scale is desirable and but a limited angular deflection of the movable element possible. The basic idea comprehending the invention consists in mounting the scale and the indicator for relative movement at an angle, ordinarily a right angle, and giving them an acute-angled inclination relatively to one another, so that when a deflection occurs the point of intersection of the two marks the reading on the scale. It is evident that with such a construction a very small angular movement and a correspondingly small angle of the pointer with relation to the scale-plate will admit of a very long scale and open readings, and by my improvements this scale is still further lengthened by employing two or more sections in one of the two relatively moving parts, each subtending only a fraction of the angular range of movement of the instrument. The position of the scale may be horizontal or vertical. For such uses as switchboard-work where floor-space is limited the scale should of course be vertical, thus permitting the instrument to use a very small horizontal space on the board. In such a type therefore the movable element may be an upright cylinder made of very light material and having a helical line, ridge, slit, or other indicating device to coöperate with a fixed scale having a straight wall or a slit parallel with the axis of the cylinder and through which the line of the cylinder can be seen only at the point where it intersects the slot or wall edge. As the cylinder rotates the point of intersection shifts up and down the slot. In such a device the line may be so placed and the scale so graduated as to indicate, if desired, only a selected portion of the whole range of the moving element instead of the whole of such range, or there may be a plurality of lines one after another on the cylinder having such an inclination that they may all sweep over the scale in succession during a maximum deflection, thus permitting the same scale to afford exceptionally-wide readings for fractional ranges of the maximum deflection.

An instrument constructed according to my invention admits also of uniform scale-markings, since the oblique line behind the scale may have such a curve as to cut equidistant points of the scale for equal increments of energy irrespective of the torque curve of the movable element. It is not essential that the movable element shall carry a cylinder, as a wire or a thin strip set edgewise or other like body affording a sharp intersection with the scale might with advantage be employed in some cases. It will be evident, moreover, from what has been said that the invention is of general application to all kinds of indications, although for purposes of exemplification it is shown in the drawings as applied to an electrical measuring instrument.

The novel features will be hereinafter more fully set forth, and definitely indicated in the claims.

Figure 2:
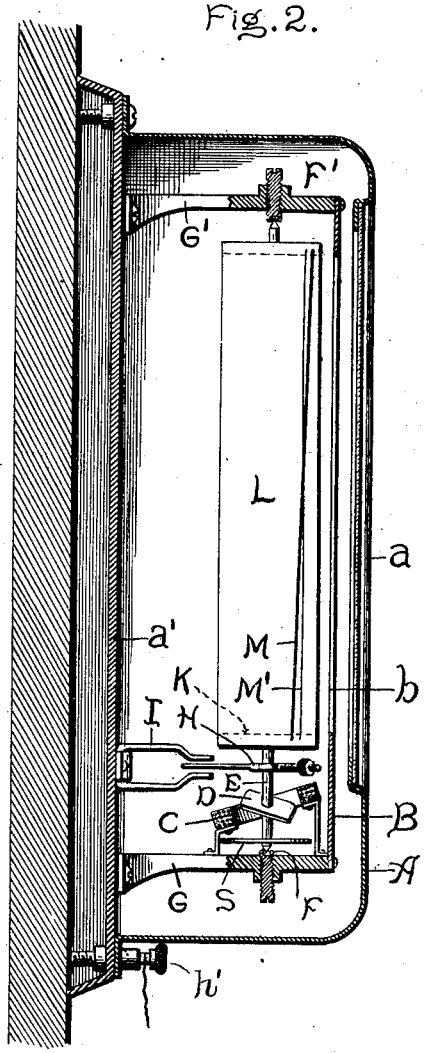
Figure 3:
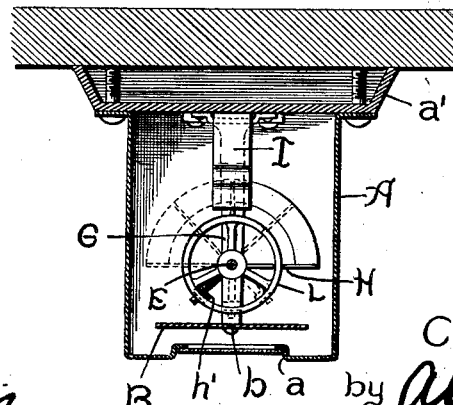
Figure 4:
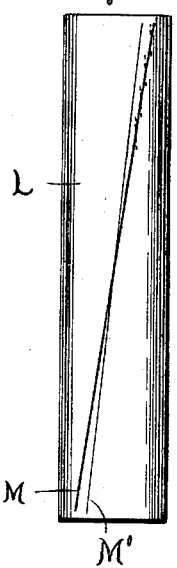
Figure 5:
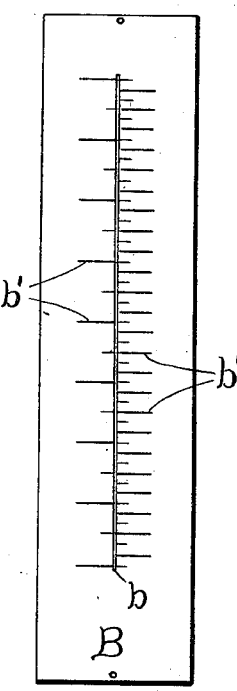
Figure 6:
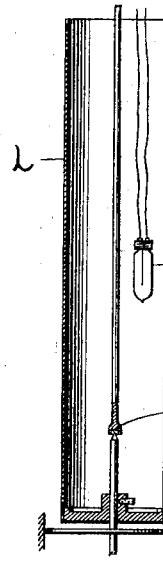
Figure 7:
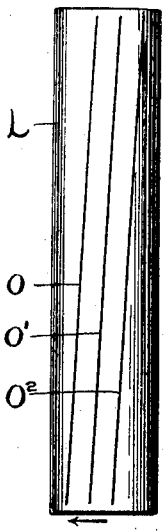
Figure 8:
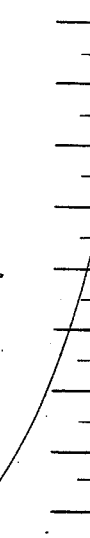
Figure 9:
Figure 10:
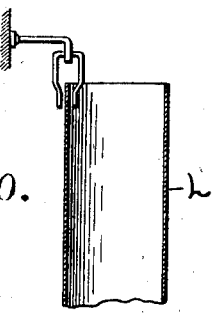

In the drawings, Figure 1 is a front elevation of an electrical measuring instrument embodying my improvements. Fig. 2 is a sectional side elevation of the same. Fig. 3 is a cross-section. Fig. 4 is an elevation of a movable indicator. Fig. 5 is a view of the scale suitable for a vertical type of instrument. Fig. 6 shows means for illuminating the indicator. Fig. 7 shows a modified indicator. Fig. 8 shows how an instrument may be given a uniform scale. Fig. 9 shows a movable indicator of little weight, and Fig. 10 shows a modified plan of damping the movable indicator.

Referring to Fig. 1, which shows a vertical type of instrument, the casing A is shown as tall and narrow, having a glass panel $a$ in its front, behind which is a scale-plate B, having a narrow slot $b$, the edge walls of which carry calibrating-marks $b'$. Behind this is mounted the movable element, as clearly indicated in Fig. 2, the operating mechanism of which may be an inclined coil C and a thin disk D of iron secured to a shaft at an angle to the axis of the coil, the whole providing a torque-producing device when electric current is led through the coil C, which tends to put the plate D in alinement with the field of force established by the coil. This arrangement is the constructiom employed in the well-known Thomson inclined coil instruments and is shown here merely by way of example, as a torque-producing agency of any character falls within the scope of my invention. The shaft may be spring-retracted by a light spiral spring S and is mounted on jewel-bearings, as indicated at F F', supported in brackets G G', fixed to the bottom of the casing. On the axis E is mounted a cylinder of considerable length relatively to its diameter, mounted symmetrically with relation to the slot $b$ in the scale-plate B. For the purpose of damping the movements of the movable element or indicator L when the circuit is closed a sector of conducting metal, as aluminium H, may be mounted on an axis and play between the poles of the permanent magnet I. Current may be led to the inclined coil C through the binding-posts $h\ h'$. The movable element, of which the cylinder L forms a part, should be as light as possible in order to reduce the momentum of the parts when a deflection occurs. I therefore make this of thin material, which may be metallic, as of aluminium, or it may be made of paper, celluloid, or other light material. Around the surface of this cylinder for an angle equal to the maximum deflection of the instrument I provide a trace, which may be an ink line, as indicated at M, extending from the bottom of the cylinder to its top and trending helically around the surface. This will be clearly understood from an inspection of Figs. 1 and 2 in the drawings in connection with Figs. 4 and 5. In front of the cylinder, between it and the observer, is located the straight scale-plate B with its longitudinal slot $b$ and graduations $b'$. The surface of the cylinder is visible throughout the whole length of the slot, and hence at some point along the slot the line M will be seen crossing it. The arrangement of the graduations and the location of the line must so correspond that the position of that portion of the line crossing the slot will correctly indicate the force which has turned the cylinder to that angular position. As this force changes the intersecting line will be seen to shift up or down the slot. The line may be stepped, as shown in dotted lines, Fig. 4, to bring the intersecting portion at right angles with the slot.

By using two or a plurality of helical lines M M' on the cylinder of different pitch and distinguished by some difference in color or appearance and having two or more sets of graduations on the scale it is possible to make one set of readings over the entire range of the instrument—say from one volt to one hundred and fifty volts—and another set over the most useful area of reading—say from one hundred to one hundred and twenty volts. By providing the cylinder with a number of independent spiral lines, as indicated in Fig. 7, I may adapt the same instrument to a number of independent sets of readings. For example, if motion of the cylinder were from right to left, as indicated by the arrow in Fig. 7, by giving the lines a suitable pitch the entire scale will be obtended by the line O with a desired range of movement—say one-third of the entire maximum deflection. Then another range of readings may be given by the line O', the bottom of which falls on the same horizontal projection as the top of the line O, and still a third range may be given by the line $O^2$ in a similar manner. Thus if the instrument were indicating amperes it is evident that an extremely open scale may be provided, a range of from one to ten amperes, for example, being readable on the line O, from ten to twenty amperes, say, on the line O', and from twenty to thirty in the line O², and the lines may be rendered distinguishable by printing or painting them in different colors on the fabric of which the cylinder is composed.

My invention also lends itself to providing a scale in which the calibrations are a uniform distance apart. This will be evident from an inspection of Fig. 8, where the intersecting line which gives the indications may be of any desired curvature to insure equidistant calibrations notwithstanding changes in the torque. The instrument may be "calibrated," so to speak, or at least the intersecting line may be traced by imposing on the instrument currents (assuming that we are calibrating an electric instrument) of uniformly-increasing value and marking on the cylinder the successive points of intersection with the scale-marks and afterward connecting these points by a line. It is evident that if the calibrations were spaced equidistant to start with a current increasing by uniform increments would successively be marked by the point of intersection of the scale and the curved line.

Instead of a damper of the kind indicated in Fig. 2 the cylinder itself may be employed for damping if constructed of aluminium, for example, by mounting a permanent magnet so as to embrace one of its ends, as indicated in Fig. 10. It is not essential that a cylinder be employed, since the invention may be carried out by mounting on the pivoted axis a wire, thread, or strip of metal bent on edge helically, as shown in Fig. 9. A strip of aluminium or thin steel, for example, may be bent helically and be mounted on light arms secured to the arbor of the movable element.

By inserting a small electric lamp N into a cylinder of transparent material the slot $b$ of the scale will be illuminated, or if the cylinder is opaque, with the lines M M' rendered translucent, the reading of the instrument will be shown by a spot of light where either line crosses the slot.

The scale-plate B may be of glass without a slot, but rendered opaque except along the line where the slot would come. This form of scale-plate may take the place of the protecting glass front, thus obviating all possible trouble from reflection.

The weight of the movable element may be decreased by providing the cylinder with a short shaft, as indicated in Fig. 6, having a bearing on a rod secured to the framework and extending down into the cylinder, the lower bearing being below the cylinder.

What I claim as new, and desire to secure by Letters Patent of the United States, is—

1. An indicating instrument provided with two relatively movable parts having indicating members intersecting each other at an angle, one of said members having a curvature with a varying slope to render the calibration independent of the law of the instrument.

2. An indicating instrument provided with two relatively movable parts having indicating members intersecting each other at an acute angle, one of said members having an inclination which throughout its indicating length subtends only a fractional angle of the extreme deflection of the instrument, whereby a selected angle of scale-readings may be effected.

3. An indicating instrument provided with two relatively movable elements having indicating members intersecting at an acute angle, one of said members having two or more angles of inclination to cover different arcs of deflection for the same scale length, whereby a scale more open in some parts than others, irrespective of the law of the instrument, may be provided.

4. An indicating instrument provided with a straight vertical scale having a longitudinal slot, and a vertical rotatable cylinder mounted on a shaft having a step-bearing below the cylinder and an upper bearing inside the cylinder.

5. In an indicating instrument, a vertical rotatable cylinder bearing a plurality of oblique lines, and a scale having an indicating edge intersecting the lines at an acute angle.

6. In an indicating instrument, the combination with a tubular cylinder having an oblique line, one being more transparent than the other, of a scale coöperating therewith, and means for illuminating the interior of the cylinder.

In witness whereof I have hereunto set my hand this 21st day of February, 1901.

CARYL D. HASKINS.

Witnesses:
  BENJAMIN B. HULL,
  GENEVIEVE HAYNES.